United States Patent
Theodore

(10) Patent No.: US 9,434,628 B2
(45) Date of Patent: Sep. 6, 2016

(54) METHOD FOR REDUCING CHEMICAL OXYGEN DEMAND OF WATERS CONTAINING STARCH, MILK, WHEY, AND OTHER SIMILAR BEHAVING ORGANIC COMPONENTS

(71) Applicant: Marcus G. Theodore, Salt Lake City, UT (US)

(72) Inventor: Marcus G. Theodore, Salt Lake City, UT (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 421 days.

(21) Appl. No.: 14/070,752

(22) Filed: Nov. 4, 2013

(65) Prior Publication Data

US 2015/0122743 A1    May 7, 2015

(51) Int. Cl.
| | | |
|---|---|---|
| *C02F 1/70* | (2006.01) | |
| *C02F 9/00* | (2006.01) | |
| C02F 1/66 | (2006.01) | |
| C02F 1/52 | (2006.01) | |
| C02F 1/78 | (2006.01) | |
| C02F 103/32 | (2006.01) | |
| C02F 101/34 | (2006.01) | |
| C02F 101/38 | (2006.01) | |
| C02F 1/56 | (2006.01) | |

(52) U.S. Cl.
CPC . *C02F 1/70* (2013.01); *C02F 9/00* (2013.01); *C02F 1/5236* (2013.01); *C02F 1/5245* (2013.01); *C02F 1/56* (2013.01); *C02F 1/66* (2013.01); *C02F 1/78* (2013.01); *C02F 2101/34* (2013.01); *C02F 2101/38* (2013.01); *C02F 2103/327* (2013.01); *C02F 2209/08* (2013.01)

(58) Field of Classification Search
CPC .................................................. C02F 1/70
See application file for complete search history.

(56) References Cited

U.S. PATENT DOCUMENTS

| 4,565,635 | A | * | 1/1986 | Le Du | ................. | C02F 1/52 |
| | | | | | | 210/727 |
| 5,614,102 | A | * | 3/1997 | Sakurada | ........... | B01D 21/01 |
| | | | | | | 210/718 |
| 7,967,990 | B2 | * | 6/2011 | Theodore | ........... | C02F 1/66 |
| | | | | | | 210/709 |
| 7,972,517 | B1 | * | 7/2011 | Miller | .............. | C02F 11/14 |
| | | | | | | 210/710 |
| 2003/0019815 | A1 | * | 1/2003 | Koga | ............. | B01F 3/088 |
| | | | | | | 210/716 |
| 2011/0247985 | A1 | * | 10/2011 | Theodore | .......... | C02F 1/66 |
| | | | | | | 210/720 |

OTHER PUBLICATIONS

Harold McGee, On Food and Cooking The Science and Lore of the Kitchen, 2004, Scribner, pp. 44-51, 611-617.
Starch, Learning Food Resource (food oregonstate.edu/), Oregon State Universi,.. htt://food.oregonstate.edu/learn/starch.html, May 23, 2012.
http://cdn.instructables.com/FRY/ZSDZ/F54HJ9TF/FRYZSDZF54HJ9.., Jul. 9, 2010.
http://origin-ars.ets-cdn com/content/image/1-s2.0-S0001868612, Nov. 13, 2013.

(Continued)

*Primary Examiner* — Peter Keyworth
(74) *Attorney, Agent, or Firm* — Marcus G. Theodore

(57) ABSTRACT

A sulfurous acid/lime alkalinization pre-treatment sequential filtration method for industrial wastewaters containing colloids of starch, milk, whey, and other similar acting organic components to condition and remove a number of chemicals/pharmaceuticals and heavy metals before the treated filtrate is land applied or undergoes further biological nitrogen reduction for open stream discharge via anaerobic and aerobic treatment.

8 Claims, 9 Drawing Sheets

(56) References Cited

OTHER PUBLICATIONS http://scienceandfooducla.files wordpress.com/2013/02/casinstructure.png.
http://benm.myweb.uga.edu/index_files/image006.gif, Sep. 14, 2013.
http://www.thecourtyarddairy.co.uk/images/31_Secondary_Phase.jpg, Sep. 14, 2013.
http://www.nature.com/ncomms/journal/v4/n3/fig_tab/ncomms2585_F7 . . . , Sep. 16, 2013.
http://4.bp.blogspot.com/_3iv5LGzCFf4/S2exPgxsP217AAAAAAAAGi, Sep. 14, 2013.
http://www.nuffieldfoundation.org/sites/default/files/images/potato-plas . . . , Sep. 14, 2013.
http://braukaiser.com/wiki/images/2/2a/Starch.gif, Sep. 14, 2013.
http://maltingandbrewing.com/wp content/uploads/2012/05/gelatinizatio . . . Sep. 14, 2013.
http://www.thaitapiocastarch.org/images/article/25/08en.jpg, Sep. 14, 2013.

\* cited by examiner

Fig 12

Burley 6/18/2013 Sampling

| Sample | Number | pH | COD mg/L | | | | | | | |
|---|---|---|---|---|---|---|---|---|---|---|
| Cheese Gossner | 1 | | 83160 | | | | | | | |
| Potato Gem State | 2 | | 83260 | | | | | | | |
| Potato/Cheese | 3 | | 84170 | | | | | | | |
| Gem St/Gossner/High Desert | 16 | | 5.54390 | | | | | | | |

| Lime/Acid Sequence | | Lime | Number | pH | COD | SO2 | Number | pH | COD | % COD Red. |
|---|---|---|---|---|---|---|---|---|---|---|
| Cheese Gossner | | | 4 | 12 | 2410 | | 7 | 2.74 | 1780 | 44% |
| Potato Gem State | | | 5 | 9.8 | 3260 | | 8 | 2.94 | 2840 | 13% |
| Potato/Cheese | | | 6 | 11.59 | 2880 | | 9 | 2.92 | 2600 | 48% |
| Gem St/Gossner/High Desert | | | 17 | 11.92 | 2220 | | 18 | 2.95 | 2570 | 42% |

| Acid/Lime Sequence | | Acid | Number | pH | COD | Lime | Number | pH | COD | % COD Red. |
|---|---|---|---|---|---|---|---|---|---|---|
| Cheese Gossner | 8 | | 10 | 2.99 | 1670 | | 13 | 11.6 | 1580 | 50% |
| Potato Gem State | 8 | | 11 | 2.91 | 2780 | | 14 | 11.36 | 2770 | 15% |
| Potato/Cheese | 8 | | 12 | 2.91 | 2280 | | 15 | 11.03 | 2500 | 40% |
| Gem St/Gossner/High Desert | 5.5 | | 19 | 2.99 | 2540 | | 20 | 11.44 | 2350 | 47% |

Burley 7/9/2013 Sampling

| Sample | Number | COD mg/L | pH | Phosph |
|---|---|---|---|---|
| Lamb Weston control | 21 | 6000 | 4.65 | 33 |
| High Desert | 22 | 4200 | 9.66 | 82 |
| Potato/Cheese Comb. | 23 | 5850 | 5.89 | |
| Gem St/Gossner/High Desert | 24 | 9400 | 4.99 | |

| Lime/Acid Sequence | | Lime | Number | pH | COD | SO2 | Number | pH | COD | % COD Red. | Phosph. |
|---|---|---|---|---|---|---|---|---|---|---|---|
| Lamb Weston control | 21 | | 25 | 11.45 | 340 | | 29 | 3 | 588 | 91% | 10 |
| High Desert | 22 | | 26 | 11 | 3300 | | 30 | 2.86 | 2570 | 39% | 52 |
| Potato/Cheese | 23 | | 27 | 11.16 | 3750 | | 31 | 3 | 4020 | 32% | 16 |
| Gem St/Gossner/High Desert | 24 | | 28 | 11.28 | 3340 | | 32 | 2.82 | 3530 | 62% | 20 |

| Acid/Lime Sequence | | Acid | Number | pH | COD | Lime | | | | % COD Red. | Phosph. |
|---|---|---|---|---|---|---|---|---|---|---|---|
| Lamb Weston control** | 21 | | 33 | 2.95 | 420 | | 37 | 11.06 | 517 | 92% | |
| High Desert | 22 | | 34 | 2.99 | 2400 | | 38 | 11.3 | 1850 | 56% | |
| Potato/Cheese | 23 | | 35 | 2.99 | 3710 | | 39 | 12.01 | 3400 | 42% | |
| Gem St/Gossner/High Desert | 24 | | 36 | 2.99 | 3760 | | 40 | 11.16 | 3210 | 66% | 5.6 |

| Alum/Ferric Chloride Seq. | Number | Alum | Number | pH | COD | Phosph | FeCl3 | Number | pH | COD | Phosph. |
|---|---|---|---|---|---|---|---|---|---|---|---|
| Lamb Weston control | 37 | | 41 | | | | | 45 | | | |
| High Desert | 38 | | 42 | | | | | 46 | | | |
| Potato/Cheese | 39 | | 43 | | | | | 47 | | | |
| Gem St/Gossner/High Desert | 40 | | 44 | 11.16 →7 | 2940 | | 6 | 48* | | | |

FIG. 12a. footnotes

| Sample** | COD | pH | Phosph | TKN |
|---|---|---|---|---|
| Lamb Weston 8/29/2013 | 6040 | 5.03 | 36.8 | 132 |
| Acid/Lime Sequence** | 1850 | 10.7 | 5.85 | 96.7 |

*at acidic pH, no alum precipitate was observed. Ferric Chloride addition to the 40 filtrate did not show any meaningful results.

**as the % removal of COD was so high, a control sample was re-tested and showed for a COD 6040 mg/l sample, a reduction to 1850 mg/l; for a 70% COD reduction.
Phosphorous reduction was similar and went from 36.8 mg/L to 5.85 mg/L

METHOD FOR REDUCING CHEMICAL OXYGEN DEMAND OF WATERS CONTAINING STARCH, MILK, WHEY, AND OTHER SIMILAR BEHAVING ORGANIC COMPONENTS

RELATED APPLICATIONS

This application claims the benefit of provisional patent application Ser. No. 61/831,821 filed Jun. 6, 2013 entitled, "METHOD FOR REDUCING CHEMICAL OXYGEN DEMAND OF WATERS CONTAINING COLLOIDS OF STARCH, MILK, WHEY, AND OTHER SIMILAR BEHAVING ORGANIC COMPONENTS.

BACKGROUND OF THE INVENTION

1. Field

This invention pertains to methods to reduce chemical oxygen demand of waters and industrial wastewater effluents containing starch, milk, whey, and other similar behaving organic components. In particular it pertains to a method for sulfurous acid/lime alkalinization pre-treatment precipitation and coagulation for sequential filtration of waters and industrial wastewaters containing starch, milk, whey, and other similar acting organic components to condition and remove a number of chemicals/pharmaceuticals and heavy metals before treated filtrate is land applied or undergoes further biological reduction for open stream discharge.

As used herein, the term chemical oxygen demand is defined as the amount of chemical and organic pollutants found in waters consuming oxygen, making COD a useful measure of water quality. It is expressed in milligrams per liter (mg/L) also referred to as ppm (parts per million), which indicates the mass of oxygen consumed per liter of solution; see Wikipedia, article on Chemical Oxygen Demand.

2. State of the Art

Various methods have been used to treat and dispose of industrial waste effluents high in chemical oxygen demand. These industrial waste waters are complex solutions and often are colloidal, making them difficult to separate for disposal. As used herein, a colloid is a substance microscopically dispersed throughout waters. The dispersed-phase particles have a diameter of between approximately 1 and 1000 nanometers normally visible with the use of an ultra-microscopic or an electron microscope. The dispersed-phase particles are affected largely by the surface chemistry present in the colloid. Some colloids are translucent because of the Tyndall effect, which is the scattering of light by particles in the colloid. Other colloids may be opaque or have a slight color.

Colloidal solutions (also called colloidal suspensions) are the subject of interface and colloid science. When particles are dispersed in liquid, most of them will carry surface charge. The surface charge will attract ions of opposite charge to form a Stern layer where the ions are strongly bound and a diffuse region where they are less firmly associated as shown in FIG. 1. The zeta potential is the electric potential in the inter-facial double layer (DL) at the location of the slipping plane versus a point in the bulk fluid away from the interface. In other words, zeta potential is the potential difference between the dispersion medium and the stationary layer of fluid attached to the dispersed particle.

Because the size of the dispersed phase may be difficult to measure, and because colloids have the appearance of solutions, colloids are sometimes identified and characterized by their physical-chemical and transport properties. For example, if a colloid consists of a solid phase dispersed in a liquid, the solid particles will not diffuse through a membrane, whereas with a true solution the dissolved ions or molecules will diffuse through a membrane. Because of the size exclusion, the colloidal particles are unable to pass through the pores of an ultra filtration membrane with a size smaller than their own dimension. The smaller the size of the pore of the ultra filtration membrane, the lower the concentration of the dispersed colloidal particles remaining in the ultra filtered liquid. The exact value of the concentration of a truly dissolved species will thus depend on the experimental conditions applied to separate it from the colloidal particles also dispersed in the liquid.

Many industrial processing wastes, such as starches, milk, and whey are hydro-colloids and have different strength COD. For example, milk and whey processing wastes typically have a COD of ~2000 mg/l, whereas potato processing wastes typically have a COD of ~4,000 to 60,000 mg/L. A hydrocolloid is a colloid system wherein the colloid particles are hydrophilic polymers dispersed in water. A hydrocolloid has colloid particles spread throughout water. These hydrocolloids are usually separated using coagulation and flocculation.

Coagulation is the destabilization of colloids by neutralizing the forces that keep them apart as shown in FIG. 2. Cationic coagulants provide positive electric charges to reduce the negative charge (zeta potential) of the colloids; whereas anionic coagulants provide negative electric charges to reduce the positive charge (zeta potential). As a result, the particles collide to form larger particles (flocs). Jar tests adding coagulants with different cationic strengths are taken to determine the best dosages for coagulation and not overdose the coagulants as this can cause a complete charge reversal and re-stabilize the colloid complex.

Flocculation is the action of polymers and other substances to form bridges between the flocs and bind the particles into large agglomerates or clumps, Generally, polymers are most often used as flocculants. Once suspended particles are formed with polymers they agglomerate into larger particles and can usually be removed from the liquid by sedimentation, media filtration, straining or floatation. These particles generally are gelatinous and thereby more difficult to dewater.

Still other industrial wastewater processing components form chemical precipitates with chemicals such as lime, alum, and ferric chloride.

Other COD reduction methods include aeration, biodegradation, land application, and ponding evaporation and infiltration. These COD reduction methods have differing costs, advantages and disadvantages The treatment method described below provides an inexpensive chemical treatment method using sulfurous acid/lime alkalinization precipitation and coagulation for sequential filtration of industrial wastewaters containing starch, milk, whey, and other similar acting organic components to condition, agglomerate and reduce suspended and dissolved solids, COD, total nitrogen, and total phosphorous in industrial effluents.

SUMMARY OF THE INVENTION

The pre-treatment method of the present invention first uses either lime or sulfurous acid to precipitate hydrocolloids, which are removed by filtration or settling. Next, either the lime or sulfurous acid not previously used is added elevate or lower the pH of the filtrate to precipitate the acidic or basic hydro-colloids, which were not previously removed. The sequence is dependent upon the milk, and starch effluent zeta potential of the colloidal suspensions and is usually determined by jar testing comparing:

I. Adding sulfurous acid to lower the pH of the industrial wastewater causing coagulation and flocculation of agglomerated solids.

II. Removing the agglomerated solids forming an acidified filtrate.

III. Adding lime to raise the pH of the acidified filtrate for coagulation and sequential filtration of the agglomerated solids.

IV. Removing the agglomerated solids from the alkaline filtrate.

V. Testing the COD of the alkaline filtrate.

The process is then reversed using lime addition first for coagulation and flocculation before filtration of the agglomerated solids. The alkaline filtrate is then acidified for coagulation and flocculation of agglomerated solids. After filtration of the acidified agglomerated solids, the COD of the acidified filtrate is then tested.

Using the treatment sequence, which best lowers COD, a pre-treatment removal system is then designed with equipment sized to handle the hydrology flows of the industrial effluent.

Activated carbon or other filler substrates may be employed to assist in coagulation and flocculation, if required, as they are easily removed by filtration.

Sulfurous acid is a weak acid, which acts as a redox agent as well as a supplier of acid to affect zeta potential. $SO_2$ is also a polar molecule that can assist in flocculation and coagulation of certain colloids. Thus, precipitation and sorption of the polar organic molecules onto any suspended solids may assist in removal. If disinfection of the industrial waste is required, the pH is lowered to 2-3.5 for ten minutes to an hour for sulfite/bisulfite pathogen kill. One hour settling is also usually sufficient for coagulation and agglomeration.

The actual pH selected is dependent upon the nature of the solubility of the colloidal suspensions and is selected by jar testing at various pH levels. An operating range is then determined for the treatment system based on fluctuations in the composition of the processed waste effluent over the operating year to insure coagulation and agglomeration.

The pH of the $SO_2$ acidified wastewater effluent is usually adjusted between 2 and 6.5 to acid leach any heavy metals from the suspended solids into the liquid phase for subsequent removal. At a pH of between 7 and 9, iron, chromium, copper, zinc, and nickel ions precipitate as hydroxides for removal. At pH levels between 7 and 9, $Fe+3$, chromium, copper, and zinc form precipitates. Zinc, Nickel, Cadmium, and lead require pH's up to 11 to precipitate out. These metal hydroxides precipitates are amphoteric, being soluble at both alkaline and acid conditions. Thus, the pH is selected to remove any desired heavy metals and then adjusted to insure that colloidal suspension are not adversely be affected.

At lower pH levels, the suspended solids also adsorb polar chemical/pharmaceuticals onto suspended particles for subsequent removal. Empirically it was found at Montalvo Municipal Improvement District that at a pH of approximately 6.5, even fine suspended clay solids self adhere in settling ponds allowing light to penetrate as much as 10 feet to the bottom of an open pond; thereby exposing the treated wastewaters to photodegradation of chemicals/pharmaceuticals.

Similarly, the pH levels for the liming for coagulation and flocculation is determined by the jar tests. Liming not only affects acid levels, but also precipitates calcium salts of excess sulfates and phosphates, such as calcium sulfate (gypsum), and calcium phosphate. These precipitate when aqueous, non-aqueous, or spent lime is used to raise the pH. If heavy metals are present, a pH of up to 11 will precipitate the heavy metals as metal hydroxides, as discussed. However, some metal hydroxide colloids dissolve at higher pH levels, so jar testing is required to determine the pH operating ranges to insure coagulation and flocculation.

At pH 12, starches begin to hydrolyze forming a yellow colored compound vs. the normal brown/gray colored starch precipitates formed between pH 7 and 11. Therefore, normally up to a pH of 11 is employed to prevent production of additional hydrolyzed chemicals, which may not agglomerate.

Based on the settling test performances and COD readings, the optimal acidification/alkalinization sequence for a particular industrial waste effluent is selected to provide the best industrial effluent COD reduction. Typical COD reduction for industrial processing of potato waste is ~42%, and for cheese waste is ~35%.

The actual BOD, TSS, and TKN reduction is determined by quantitative lab testing. The selection of the industrial pre-treatment sequence is dependent upon the initial composition of the industrial effluent as well as the discharge requirements.

The chemical reactions of this pre-treatment method are chemical oxidation/reduction, and acidification/alkalinization utilizing sulfurous acid and lime as its basic components to treat industrial wastewater effluent to coagulate, and separate solids. This pre-treatment method is employed particularly with industrial wastewater effluent before entering municipal wastewater treatment plants. The pre-treatment processes of coagulation and flocculation separates dissolved and suspended solids from the liquid fraction. Although the terms coagulation and flocculation are often used interchangeably, hereafter the single term "flocculation" will be used to describe both; even though they are two distinct processes. Finely dispersed solids (colloids) suspended in wastewaters are stabilized usually by negative electric charges on their surfaces, causing them to repel each other and remain in suspension. Since this prevents these charged particles from colliding to form larger masses, called flocs, they do not readily settle. To assist in the removal of colloidal particles from suspension, the pre-treatment process of the present method uses both alkaline reagents, such as lime and spent lime, and acidic reagents, such as sulfurous acid to chemically neutralize or alter the particle charges to coagulate suspended solids for subsequent filtration removal. Although other alkaline reagents may be employed, lime is relatively inexpensive and further adds calcium ions, which aids in precipitating compounds for filtration removal, as well as conditioning soils by off-setting monovalent sodium and chlorides in the filtrate for land application. Sulfurous acid is employed as it not only removes colloidal particles, but chemically dewaters them upon drying.

The sequential order for chemical treatment and filtration removal is largely dependent upon the industrial treatment and the resultant effluent compositions generated. For example, milk and whey industrial wastewaters are complex aqueous solutions of water, minerals, fats, proteins, lactose suspended as hydro-colloids and course dispersions suspended in emulsions. In a molecular solution the molecules are only partly, if at all, dissociated into ions. The degree of dissociation represents an equilibrium, which is influenced by other substances in the solution and especially by the pH (hydrogen ion concentration) of the solution, which curdles many fats, proteins and lactose.

In a colloidal solution, one substance is dispersed in another in a finer state than an emulsion but the particle size is larger than that in a true solution. Colloidal systems are classified according to the physical state of the two phases. The solid particles consisting of groups of molecules float freely in the colloid. The colloid particles are much smaller than those in a suspension and a colloid is much more stable.

An emulsion consists of one immiscible liquid dispersed in another in the form of droplets in the dispersed phase. The other phase is referred to as the continuous phase. The systems have minimal stability and require the presence of surface-active or emulsifying agents for stability. In foods, emulsions usually contain oil and water. If water is the continuous phase and oil the dispersed phase, it is an oil-in-water (o/w) emulsion, e.g. milk or cream. In the reverse case the emulsion is a water-in-oil (w/o) type, e.g. butter. In summary, an emulsion consists of three elements, the continuous phase, the dispersed phase and the emulsifying agent. Certain particles are polar and contain different miscible and immiscible segments. Changing the nature of the phase often affects the abilities of the particles to maintain in suspension.

A dispersion is obtained when particles of a substance are dispersed in a liquid. A suspension consists of solid particles dispersed in a liquid, and the force of gravity can cause them to sink to the bottom or float to the top. For example, fine sand, dispersed in water, soon settles out.

There are dozens of different proteins floating around in milk formed in two basic groups: curds and whey. FIG. 3 shows the milk plasma phase vs. the milk serum phase. The curd proteins comprise caseins, which clump together in acid conditions to form a solid mass, or coagulate. The whey proteins remain suspended in the acidic liquid. Caseins usually outweigh the whey proteins, such as is cow's milk where it is 4 to 1.

Curd and whey proteins are largely tolerant of heat, and boil down to a fraction of their volume, but quickly coagulate in acid as the casein micelles flock together. FIG. 4 is a cross section of a micelle showing its hydrophobic core surrounded by water adhering to its K-casein and the tails of its phosphate groups. Much of the calcium in milk is in the micelles, where it acts as a kind of glue holding protein molecules together into small clusters of 15-25 as shown in FIG. 5. Another milk portion helps pull several hundred of the clusters together to form larger micelles held together by the water-avoiding hydrophobic portions of the proteins bonding to each other as shown in FIG. 6 where salt is added to form intermicellar bridging for curd formation in cheese processing. The pH, and calcium flocculation affects and ranges are shown in FIG. 7.

To keep the micelles separate, one member of the casein family, kappa-casein, caps the micelles once they reach a certain size and prevents them from entangling and growing larger. One end of the kappa-casein molecule extends from the micelle into the surrounding liquid and forms a negatively charged layer that repels other micelles at milk's normal pH of ~6.5. As the pH is lowered to pH 5.5, the kappa-casein's negative charge is neutralized and the micelles gather in clusters. At this pH of 5.5, the calcium glue that holds the micelles together begins to dissolve and the micelles start falling apart. As the pH is further lowered around pH 4.7, the scattered casein proteins lose their negative charge, and bond to each other again and form a continuous fine network forming curds, which are then removed. The exact pH selected for curdling is dependent upon the type of milk effluent. It was found that a pH of ~3 not only precipitates the micelles, but the separated curds are disinfected if held for an hour.

Whey proteins constitute a number of different nutritive, compounds supplying amino acids and calcium, as well as defensive proteins, and molecules that bind to and transport other nutrients and enzymes. The most abundant whey protein is lactoglobulin. Lactoglobulin denatured in acid has relatively little casein and will bind to itself and coagulate into clots for separation. Industrial cheese making operations often employ digestive enzymes, such as chymosin to give the casein micelles a haircut; thereby causing them to clump together, leaving little casein in solution. Under these conditions, the lactoglobulin also binds together under acid conditions.

Proteins are an extremely important class of naturally occurring compounds that are essential to all life processes. They perform a variety of functions in living organisms ranging from providing structure to reproduction. Milk proteins represent one of the greatest contributions of milk to human nutrition. Proteins are polymers of amino acids. Only 20 different amino acids occur regularly in proteins. They have the general structure:

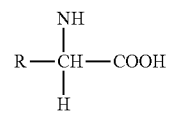

where R represents the organic radical. Each amino acid has a different radical and this affects the properties of the acid. The content and sequence of amino acids in a protein therefore affect its properties. Some proteins contain substances other than amino acids, e.g. lipoproteins contain fat and protein. Such proteins are called conjugated proteins, the most important of which for effluent disposal are Phosphoproteins, which has phosphate linked chemically.

Industrial effluents typically are relatively high in phosphorous contained in milk and starch feedstock, and further increased as manufacturer's routinely use phosphoric acid for cleaning their equipment. Phosphorous tends to accumulate in soils when land applied. In biological systems, phosphorus is found as a free phosphate ion in solution and is called inorganic phosphate, to distinguish it from phosphates bound in various phosphate esters. Inorganic phosphate is generally denoted $P_i$ and at physiological (neutral) pH primarily consists of a mixture of $HPO_2^{-4}$ and $H_2PO^{-4}$ ions.

Inorganic phosphate can be created by the hydrolysis of pyrophosphate, which is denoted $PP_i$:

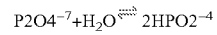

However, phosphates are most commonly found in the form of adenosine phosphates, (AMP, ADP and ATP) and in DNA and RNA and can be released by the hydrolysis of ATP or ADP. Similar reactions exist for the other nucleotide diphosphates and triphosphates. Phosphoanhydride bonds in ADP and ATP, or other nucleotide diphosphates and triphosphates, contain high amounts of energy which give them their vital role in all living organisms. They are generally referred to as high energy phosphate, as are the phosphagens in muscle tissue. Total phosphorous in milk is ~95.8 mg/100 ml, with 36.2 mg/100 ml dissolved, and 59.6 mg/100 ml colloidal.

Other salts in milk are calcium ~1320.1 mg/100 ml total, with 51.8 mg/100 ml dissolved, and 80.3 mg/100 ml colloidal; magnesium ~10.8 mg/100 ml total, with 7.9 mg/100 ml dissolved, and 2.9 mg/100 ml colloidal; and citrate ~156.6 mg/100 ml total, with 141.6 mg/100 ml dissolved, and 15 mg/100 ml colloidal.

As discussed above, these salts form precipitates with excess levels of calcium, or coagulate as the zeta charge is neutralized via raised or lowered pH with acid adjustment, especially when calcium salts are employed. As milk and cheese flavors are affected by pH during processing, flocculation and coagulation is rigidly controlled, often leaving considerable curds and whey proteins left in the industrial effluent solution to prevent adverse flavors in the finished product. This results in industrial effluents high in COD typically ~2000 mg/l, and elevated phosphorous levels often in excess of 35 mg/l.

In addition, milk and cheese process effluent often includes milk fats in the form of butter resulting from stirring or processing, which damages microscopic globules releasing their fats to stick together in ever larger masses. These fat globules in industrial effluent may be removed as emulsifications using starches from industrial starch effluent blended to form combination precipitates, which are then removed via filtration separation to further reduce COD and P levels. These symbiotic treated combination milk and potato effluents generally have lower COD and P levels than their separate counterparts.

Starch industrial processing generates even higher COD effluents, which must be reduced before land application or open stream discharge. The starch molecule is a polysaccharide assembled from the simple sugar glucose. It can contain anywhere from five hundred to several hundred thousand glucose molecules joined by covalent bonds into a single granular structure with the starch molecules oriented in a radially oriented crystal as shown in FIG. 8.

Chemically, starch is composed of two different molecules, amylose and amylopectin shown in FIG. 9. Amylose has glucose molecules linked in a "linear" fashion via tetrahedral carbon bond angles, which gives amylose an overall spiral shape. Amylopectin has glucose molecules aligned at regular intervals with a different linkage between two adjacent glucoses. This different linkage results in the formation of a branched structure forming a treelike shape. Plant starch is typically 20 to 30 percent amylose and 70 to 80 percent amylopectin.

Starch granules are formed of amorphous growth rings shown in FIG. 10 with semi crystalline regions and crystalline regions arranged with double helices of glucose chains. The amylopectine branch points have $\alpha(1\text{-}6)$ links with the glucose chain linked by $\alpha(1\text{-}4)$ links).

Starch molecules are broken down by enzymes known as amylases. The digestibility of a specific starch is influenced by its physical form. In plants starch is present in microscopic granules, which impairs enzymatic digestion of starch molecules obtained from plants. Cooking starch-containing items results in the hydration of starch molecules and the swelling of starch granules, enhancing and increasing the rate of the enzymatic breakdown of starch. Enzyme amylases also convert starch to glucose. Thus industrial treatments employing heat and enzymes affect the compositions of the waste effluent.

Morphology and molecular composition of starch granules vary between genotypes. Cereal starches, such as maize and wheat contain lipids with starch associated lipids phosphorylated. Potato starch granules contain no lipids so their phosphate is covalently bound to the glucose residues in the amylopectin molecules of the starch granules. Potato starches also contain little protein compared to cereal starches. These differences impact the physical properties of the starches and also influence the processes by which starch granules are isolated both in industry and laboratory scale. Non-starch associated lipids in cereal grains are removed in industry via a wet milling step. Rice starch may be isolated successfully from rice flour by a physical disruption of the starch-protein agglomerates by use of various density gradient systems. The optimal industrial procedure for starch isolation is a combined NaOH steeping and a protease treatment. A study comparing barley starch isolation methods concluded that loss of the fraction of small B starch granules could be avoided by a protease treatment of the starch slurry.

Physical modification of starch can be done by heat-treatment of the granules either at very low humidity and high temperature (i.e. heat-moisture treatment) or in excess water at low temperature for a prolonged period (i.e. annealing). The annealing treatment alters the molecular chrystallinity of the granules, which causes enhanced viscosity properties and can be seen as a change in DSC melting profile of the starch. In all starch processes the starch granules are soaked and washed in water for a period of time with a risk that starch granules are annealed during the process as shown in FIG. 10 where the raw starch granules made up of amylose and amylopectin begin to swell and leak amylose. The addition of water breaks up amylose crystallinity and disrupts helices as the granules swell leaking amylose to form a gel as shown in FIG. 11

Acid treatment of starch (i.e. acid thinning) is generally used to lower the viscosity of a starch paste in order to be able to disperse larger amounts of starch without excessive thickening of the paste. Even though the integrity of the granules is retained the intrinsic properties are changed as the acid cuts the starch molecule into smaller sizes as shown in FIG. 12. It is therefore important to consider the acidity of the water used in the industrial process of starch isolation. The properties of starches are therefore highly dependent of the manufacturing history and the composition of the starch itself.

Other starches with different length chains are manufactured with different methods to modify their thickening properties, such as Acid-treated starch (E1401), also called thin boiling starch, prepared by treating starch or starch granules with inorganic acids, e.g. hydrochloric acid breaking down the starch molecule and thus reducing the viscosity.

Other starch treatments producing modified starches (with different E numbers) are:
- dextrin (E1400), a roasted starch with hydrochloric acid
- alkaline-modified starch (E1402) treated with sodium hydroxide or potassium hydroxide
- bleached starch (E1403) treated with hydrogen peroxide
- oxidized starch (E1404) treated with sodium hypochlorite, breaking down viscosity
- enzyme-treated starch (INS: 1405), treated with maltodextrin, cyclodextrin
- monostarch phosphate (E1410) treated with phosphorous acid or the salts sodium phosphate, potassium phosphate, or sodium triphosphate to reduce retrogradation
- distarch phosphate (E1412) treated by esterification with for example sodium trimetaphosphate, cross-linked starch modifying the rheology, the texture
- acetylated starch (E1420) esterification treated with acetic anhydride hydroxypropylated starch (E1440) starch ether, treated with propylene oxide, increasing viscosity stability hydroxyethyl starch, treated with ethylene oxide Octenyl succinic anhydride (OSA) starch (E1450) used as emulsifier adding hydrophobicity cationic starch, adding positive electrical charge to starch carboxymethylated starch treated with monochloroacetic acid adding negative charge and combined modifications such as phosphated distarch phosphate (E1413), hydroxypropyl distarch phosphate (E1442), acetylated oxidized starch (E1451).

Modified starch may also be a cold water soluble, pregelatinized or instant starch which thickens and gels without heat, or a cook-up starch which must be cooked like regular starch. Drying methods to make starches cold water soluble are, extrusion drum drying or spray drying.

Other starch derivates are glucose, high fructose syrup and glucose syrups, starch degraded with amylase enzyme to make a sweetener.

Consequently, the settling and agglomeration properties of the dissolved and suspended solids in industrial effluent are significantly affected by the nature of the feed stock and manufacturing operations generating the effluent. The advantage of the present method is that it uses both acidic and basic treatments and charged ions to agglomerate different electrically charged particles generated by different manufacturing processes. For example, liming adding $Ca^{2+}$ ions agglomerates starches as shown in FIG. 13

Oxidation and reduction conditions are further controlled to aid in agglomeration of suspended solids. The present method in addition selectively precipitates phosphorous salts for filtration removal. Total nitrogen contained in the dissolved or suspended solids is also removed to lower nitrogen concentrations in the filtered treated effluent.

An example of the present method was applied to the starch processing effluent waste at the Lamb Weston potato processing facility in American Falls, Id. This facility produces different effluent potato starch concentrations during the year depending on the manufacturing processing sequence employed at the time. One acid/liming test was sequentially applied to its effluent having COD of 6040 mg/L, total nitrogen of 132 mg/l, total phosphorous of 36.8 mg/l, and a pH of 5.03. The sulfurous acid sequence first reduced the effluent pH from a pH of 4.28 to ~3, which precipitated significant suspended and dissolved solids settling in an hour. These precipitated solids were filtered and separated, leaving clear filtrate. The clear filtrate was then limed raising the pH to 10.7 to precipitate dissolved starches and calcium phosphate forming various granular precipitates, which were filtered. This resulted in a filtrate with a reduced COD of 1850 mg/l (70% reduction), total nitrogen of 96.7 mg/l (27% reduction) and total phosphorous of 5.85 mg/l (75% reduction). The pre-treated effluent with lower COD, nitrogen, and phosphorous allows more treated effluent to be land applied without soil buildup (Lamb Weston applies is effluent to raise alfalfa crops), or reduces the load on biological reactors used for further reduced COD, nitrogen, and phosphorous removal.

The treatment method thus provides an inexpensive chemical treatment method using sulfurous acid/lime alkalinization, oxidation/reduction precipitation and coagulation for sequential treatment and filtration of industrial wastewaters containing starch, milk, whey, and other similar acting organic components to condition, agglomerate and reduce suspended and dissolved solids, COD, total nitrogen, and total phosphorous in industrial effluents.

DESCRIPTION OF THE DRAWINGS

FIG. 12 illustrates how the intrinsic properties are changed as acid cuts the starch molecule in smaller sizes.

FIG. 13 illustrates how liming adding $Ca^{2+}$ ions agglomerates starches.

FIG. 14 summarizes field testing results for different industrial effluent showing their COD, N, and P reduction.

FIG. 14a contains the footnotes to FIG. 14

DESCRIPTION OF THE ILLUSTRATED EMBODIMENTS

Figure 1:
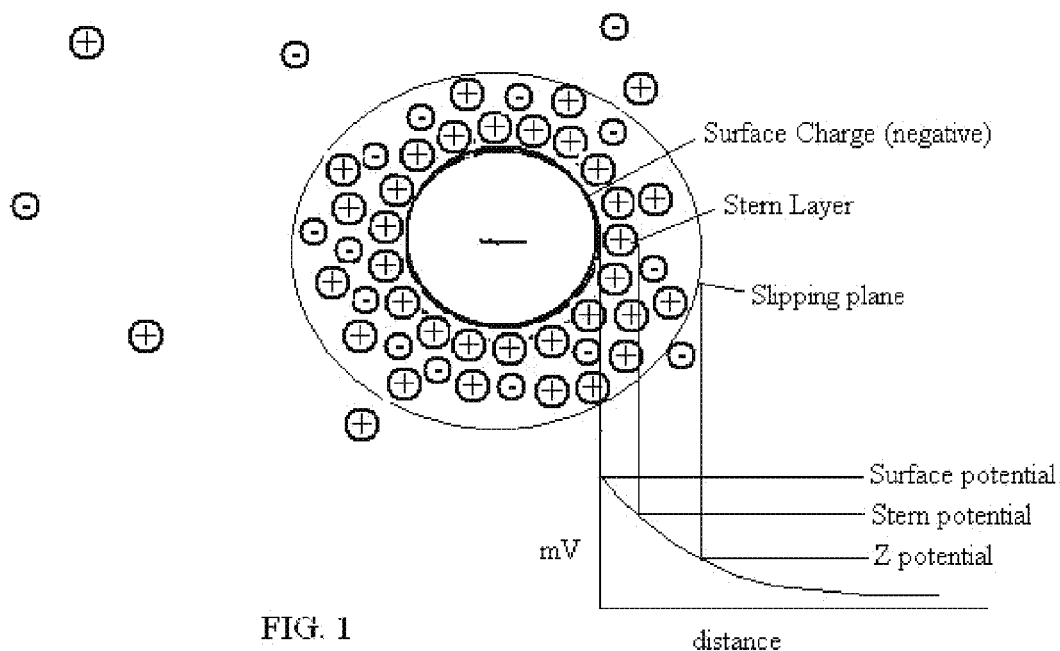
FIG. 1 is an illustration of the negative surface charge of a colloidal particle in a polar medium.

FIG. 1 is an illustration of the negative surface charge of a colloidal particle in a polar medium.

Figure 2:
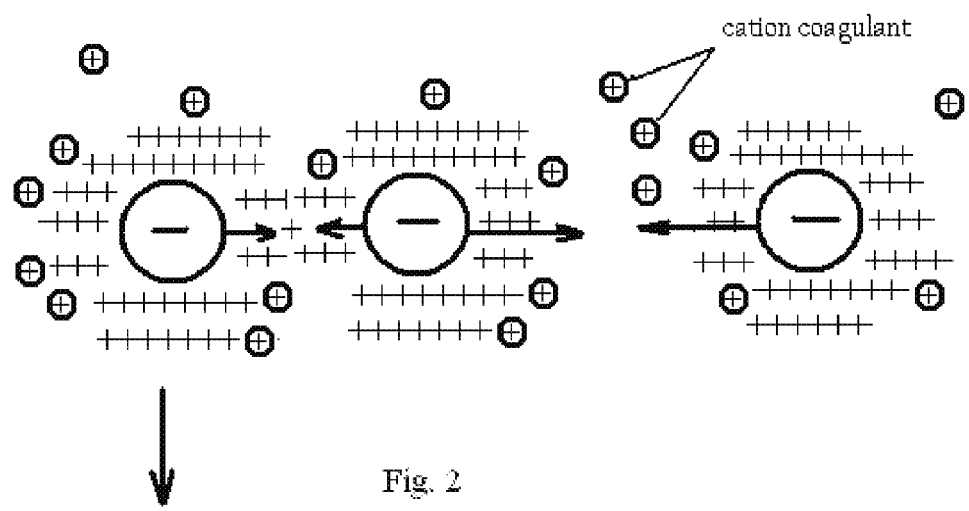
FIG. 2 illustrates the destabilization of colloids by neutralizing the forces that keep them apart.

FIG. 2 illustrates the destabilization of colloids by neutralizing the repulsive forces that keep them apart.

Figure 3:
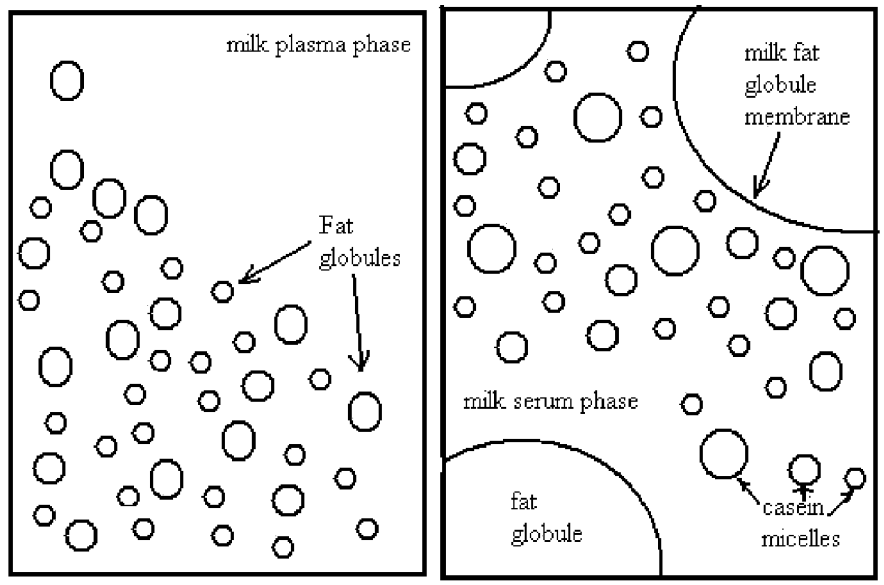
FIG. 3 is an illustration of milk solutions showing its plasma phase and serum phase.

FIG. 3 is an illustration of milk solutions showing its plasma phase and serum phase.

Figure 4:
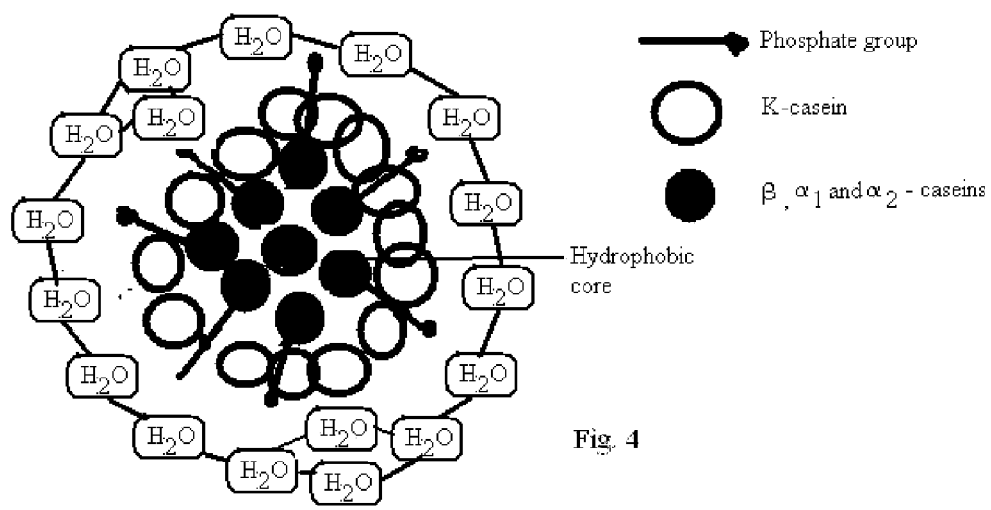
FIG. 4 is a cross section of a micelle showing its hydrophobic core surrounded by water adhering to its K-casein and the tails of its phosphate groups.

FIG. 4 is a cross section of a micelle showing its hydrophobic core surrounded by water adhering to its K-casein and the tails of its phosphate groups.

Figure 5:
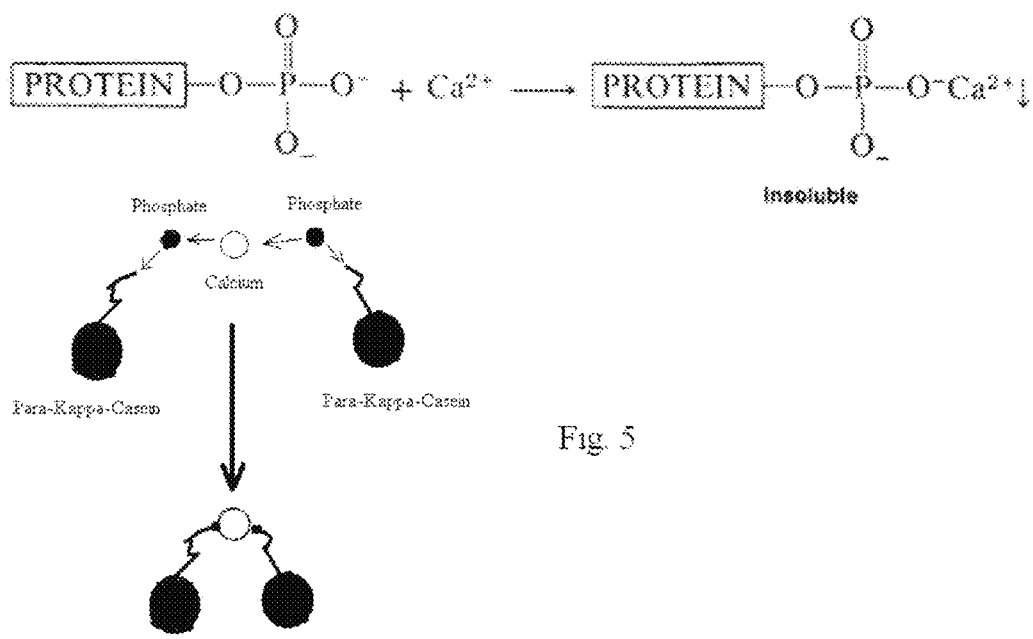
FIG. 5 illustrates how calcium acts as glue holding protein molecules together into small clusters of 15-25.

FIG. 5 illustrates how calcium acts as glue holding protein molecules together into small clusters of 15-25.

Figure 6:
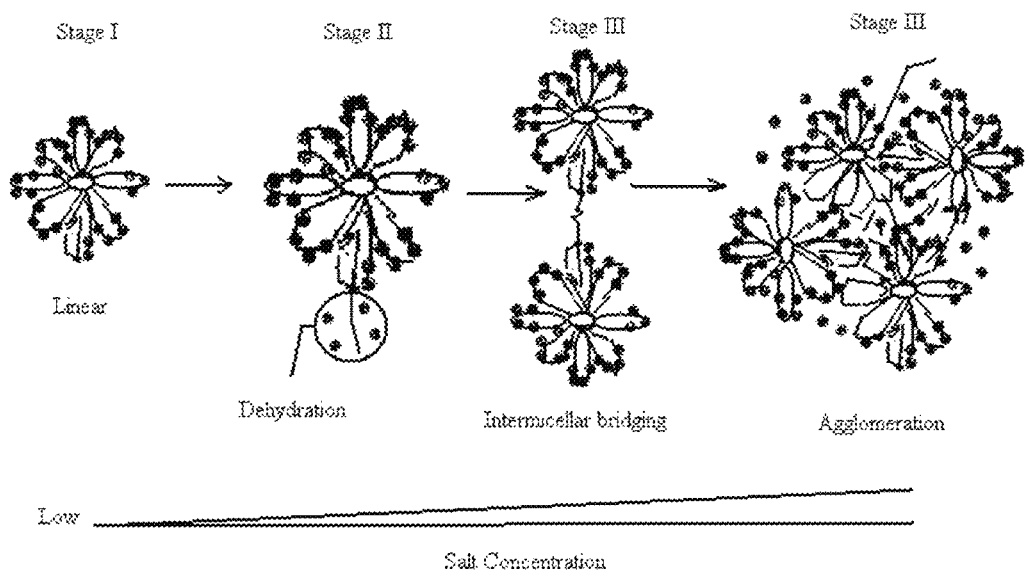
FIG. 6 illustrates intermicellar bridging for curd formation

FIG. 6 illustrates intermicellar bridging for curd formation

Figure 7:
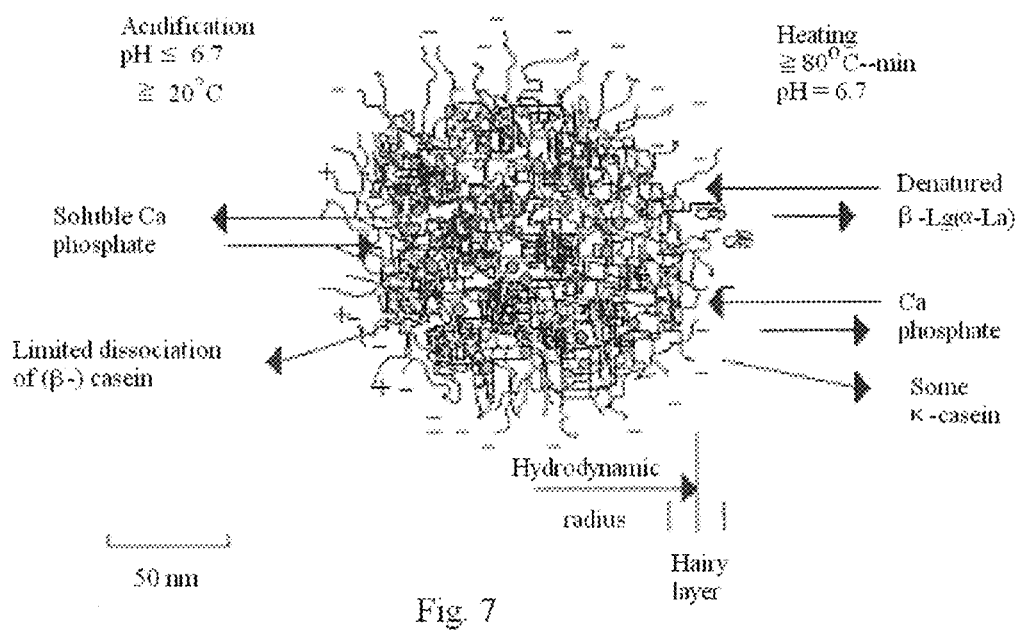
FIG. 7 discloses the pH, and calcium affects and ranges on intermicellar bridging.

FIG. 7 discloses the pH, and calcium affects and ranges on intermicellar bridging.

Figure 8:
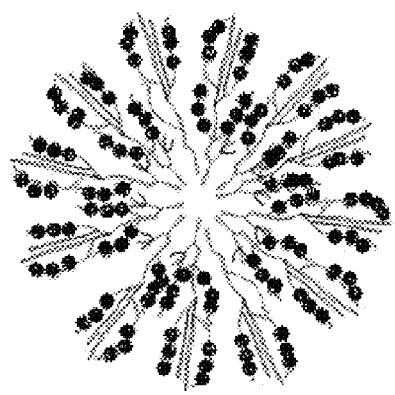
FIG. 8 illustrates a cross section of a starch grain with its starch molecules oriented in a radially oriented crystal.

FIG. 8 illustrates a cross section of a starch grain with its starch molecules oriented in a radially oriented crystal.

Figure 9:
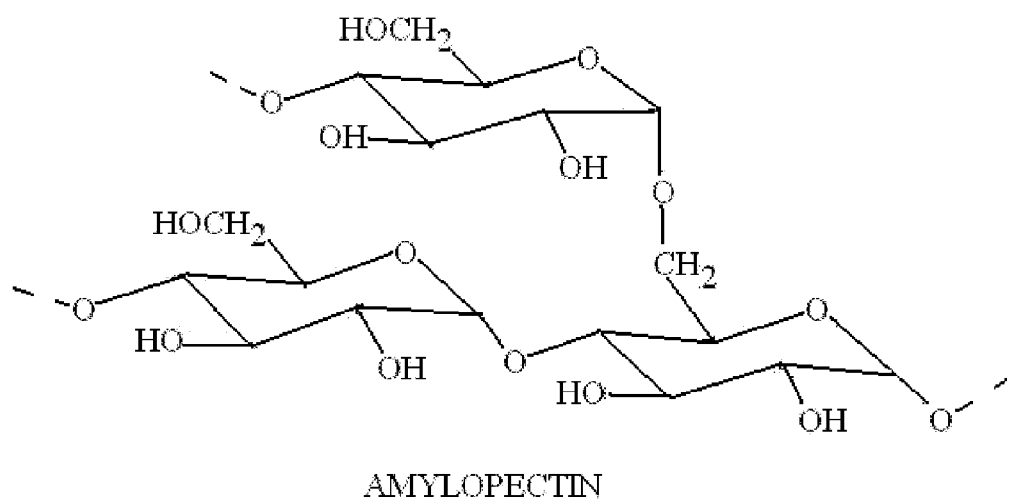
FIG. 9 illustrates two different starch molecules, amylose and amylopectin.
Figure 9:
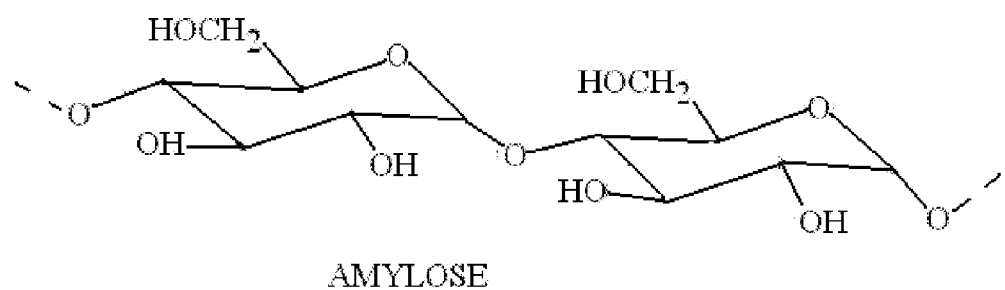

FIG. 9 illustrates two different starch molecules, amylose and amylopectin.

Figure 10:
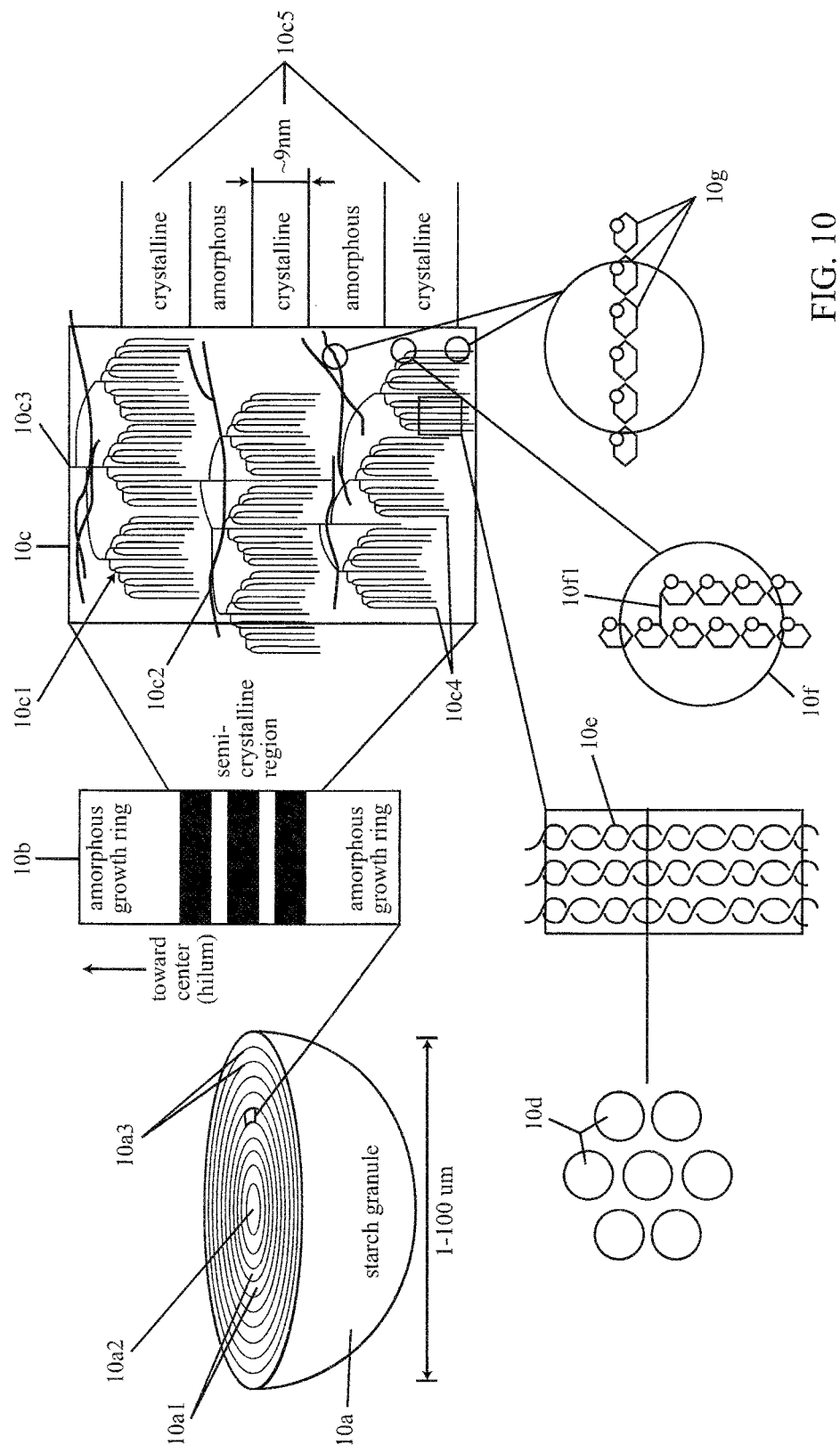
FIG. 10 shows the structure of starch granules formed of amorphous growth rings with semi crystalline regions and crystalline regions arranged with double helices of glucose chains.

FIG. 10 shows the structure of starch granules formed of amorphous growth rings with semi crystalline regions and crystalline regions arranged with double helices of glucose chains.

Figure 11:
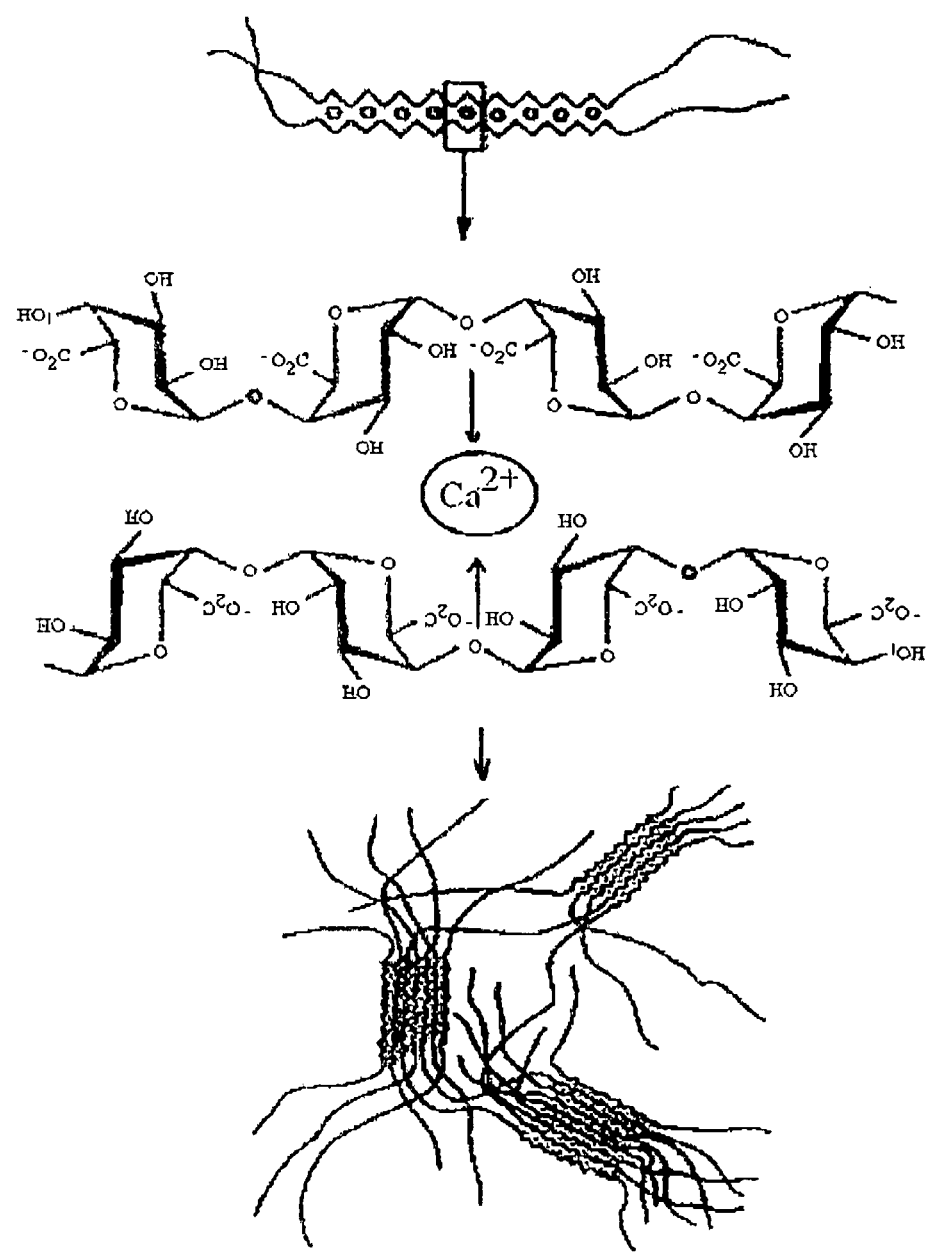
FIG. 11 illustrates how the addition of water breaks up amylose crystallinity and disrupts helices as the granules swell leaking amylose to form a gel.

FIG. 11 illustrates how the addition of water breaks up amylose crystallinity and disrupts helices as the granules swell leaking amylose to form a gel.

FIG. 12 illustrates how the intrinsic properties are changed as acid cuts the starch molecule in smaller sizes.

FIG. 13 illustrates how liming adding $Ca^{2+}$ ions agglomerates starches.

FIG. 14 summarizes field testing results for different industrial effluent showing their COD, N, and P reduction.

FIG. 14 summarizes the Field testing results for different industrial effluents. From the field testing at five difference industrial plants, combined solutions of different milk, starch, and cheese processing effluents resulted in better precipitation removal. Also, the higher the concentration of COD and phosphorous in the industrial effluent, the better percentage removal of phosphorous and COD reduction occurred. For example, the Gem state starch effluent, combined with the Gossner cheese effluent, and the High Desert milk effluent had a COD of 9400 mg/l and phosphorous of ~35 mg/l. With the acid/lime precipitation and filtration sequence, the COD was reduced 66% to 3210 mg/l, and the phosphorous was reduced 84% to 5.6 mg/l.

FIG. 14a contains the footnotes to FIG. 14

If the COD is still too high for the desired end usage, the alkaline filtrates and acidified filtrates can be supplementary treated with an aeration or ozonation cycle to further oxidize COD in the filtrate, as well as kill viruses. This oxidation/reduction cycle also has a degrading effect on many chemicals/pharmaceuticals. In addition, alum and ferric chloride may be added for additional precipitation assistance and removal of suspended solids.

If different composition waste streams are to be treated, such as the combined cheese effluent and potato effluent entering the City of Burley, Id.'s wastewater treatment plant, different combinations of these waste streams should be tested to determine if their hydro-colloids interact in a manner, which improves coagulation and flocculation in the same manner as milk-based sauces are starch thickened. The pre-treatment system may therefore including an effluent blending step.

As the nature of industrial milk and whey processing varies dependent upon the composition of the raw milk processed during the year, the source and type of cows producing the raw milk, etc., the actual design of the pre-treatment system may require reversal of the pre-treatment sequence during the year. Similarly, starches vary in composition based on time of harvest, the type of fields producing the crops, etc., so they also may require reversal of the pre-treatment sequence.

Based on the foregoing settling tests and resultant COD reductions, the treated effluent filtrate is next tested for TKN and Phosphorous reduction. For example, the removal of the suspended and dissolved starches reduces nitrogen and phosphorous. Preliminary testing of nitrogen and phosphorous removal at the Lamb Weston potato processing plant showed COD of 5560 mg/l, nitrogen TKN of 150 mg/l, and phosphorous of ~31 mg/l. With the acid/lime precipitation and filtration sequence, the COD was reduced 25% to 4220 mg/l, the TKN was reduced 37% to 95.7 mg/l, and the phosphorous was reduced 82% to 5.75 mg/l.

The end use of the treated industrial effluent TKN and phosphorous is then factored into the requirements for disposal, or land application. For example, applying the method in Idaho at one potato processing facility, both sequences resulted in fairly clear filtrates. The basic to acid sequence was faster, and had the additional benefit of providing a pH 5 to 6.5 acidic filtrate better suited for land application opening soil pores for better crop production, as well as increasing pond percolation rates during pond storage in the non-growing season.

Thus, the selection of the industrial pre-treatment sequence is dependent upon the discharge requirements and end use of the treated effluent. The actual BOD, TSS, and TKN reduction is evaluated via quantitative lab testing. The pre-treatment method results in lesser concentrated industrial effluents reducing loading on industrial wastewater treatment biological removal systems Although this specification has referred to the illustrated embodiments, it is not intended to restrict the scope of the appended claims. The claims themselves contain those features deemed essential to the invention.

I claim:

1. A method for reducing chemical oxygen demand of waters containing starch, milk, whey, colloidal suspensions, and other similar behaving organic components containing phosphorous, and nitrogen compounds comprising:
   a. determining the waters settling characteristics of any colloidal suspensions, solids and organic components by:
      i. first exposing the waters to sulfurous acid to coagulate and flocculate acid agglomerated solids formed at a pH between approximately 1.5 and 4.5,
      ii. removing acid agglomerated solids leaving an acidified filtrate,
      iii. adding lime to raise the pH of the acidified filtrate to coagulate and flocculate basic agglomerated solids at a pH above 8,
      iv. filtering and removing basic agglomerated solids leaving an alkaline filtrate,
      v. testing the COD of the alkaline filtrate,
      vi. second reversing the chemical treatment process by first exposing the waters to lime precipitation and separation of any basic agglomerated solids formed at a pH above 8 leaving a basic filtrate, which is then treated with sulfurous acid to lower the pH between approximately 1.5 and 4.5 for precipitation and separation of any acid agglomerated solids leaving a second acid filtrate and measuring its chemical oxygen demand,
   b. selecting the chemical treatment sequence, which provides the lowest chemical oxygen demand of a final filtrate, and
   c. applying the selected chemical treatment sequence to the waters to reduce their chemical oxygen demand, phosphorous and nitrogen compounds.

2. A method for reducing chemical oxygen demand of waters according to claim 1, including adding alum and ferric chloride to precipitate additional phosphorous agglomerated solids for removal.

3. A method for reducing chemical oxygen demand of waters according to claim 1, including adding activated carbon to the filtrates to aid in agglomeration.

4. A method for reducing chemical oxygen demand of waters according to claim 1, including mixing milk and cheese industrial effluent with potato industrial effluent to improve agglomeration.

5. A method for reducing chemical oxygen demand of waters according to claim 1, including lowering the temperature of the waters to improve agglomeration.

6. A method for reducing chemical oxygen demand of waters according to claim 1, wherein a number of pharmaceuticals and chemicals are adsorbed onto the agglomerated solids and removed during the treatment process.

7. A method for reducing chemical oxygen demand of waters according to claim 1, wherein the final filtrate is oxygenated or ozonated for further COD reduction.

8. A method for reducing chemical oxygen demand of waters according to claim 1, including heating the acidified filtrates and alkaline filtrates to increase coagulation and flocculation.

* * * * *